Patented Dec. 6, 1949

2,490,489

UNITED STATES PATENT OFFICE 2,490,489

PROCESS FOR COPOLYMERIZING MALEIC ANHYDRIDE AND STYRENE

Ernest J. Tauch, Cleveland Heights, Ohio, assignor to E. I. du Pont de Nemours & Company, Wilmington, Del., a corporation of Delaware No Drawing. Application February 3, 1944, Serial No. 520,931

4 Claims. (Cl. 260—78.5)

This invention relates to polymerization processes and more particularly to processes in which styrene and maleic anhydride are copolymerized in xylene solution, the xylene is removed, and the copolymer is thereafter hydrolyzed in aqueous alkali solution.

Processes for the polymerization of styrene and maleic anhydride in xylene solution and for the hydrolysis of the resultant copolymer are described in Condo et al. U. S. Patent 2,286,062. According to the processes of that patent, the polymerization in xylene solution is carried out and the resultant product is digested with sufficient aqueous caustic soda solution to promote rapid hydrolysis of the copolymer and effect transfer of the polymer to the aqueous constituent. The amount of caustic soda necessary for this purpose, according to the Condo patent, is about from one-eighth to one-third of the total amount of caustic required to give a final product having a pH of from 4.8 to 5.7 measured in a 25 per cent aqueous solution.

The processes described in the Condo patent are stated to operate satisfactorily when the styrene used in the polymerization contains no substantial amount of polystyrene. Unfortunately, the presence of polystyrene in the crude styrene commercially available is difficult to avoid and hence the observance of this condition entails extra expense.

According to the processes of the present invention, it has been found that the complete avoidance of polystyrene in the crude styrene used is not necessary if all of the xylene used as a solvent in the polymerization step is removed before the hydrolysis of the copolymer has been completed. It is preferred, according to this invention, to remove all of the styrene before the amount of alkali added to the copolymer exceeds about one-tenth of the amount ultimately to be used to give a product having a pH of from 4.8 to 5.7, measured in a 25 per cent solution.

The employment of processes of this invention makes possible the use of commercially available crude grades of styrene which have hitherto been considered unsuitable by reason of their polystyrene content. Moreover, difficulties heretofore encountered due to the formation of stable emulsions during the xylene removal are obviated and the time required for the xylene removal is minimized.

To carry out the processes of this invention, styrene and maleic anhydride are polymerized in xylene solution as described in the beforementioned Condo et al. patent and the xylene is then removed before hydrolysis and neutralization of the product has been completed. The xylene may be removed by adding water, allowing the xylene to separate by gravitation, siphoning or decanting off the xylene layer, and removing residual xylene by steam distillation from the aqueous phase thus obtained. With the water added there may also be added a small amount of alkali, but this amount should not be sufficiently large, nor should the time and temperature conditions be such, that hydrolysis of the product is completed prior to complete removal of the xylene. By keeping the amount of alkali so added below about one-tenth of the total amount ultimately needed for hydrolyzing and neutralizing the product to a pH of 4.8 to 5.7, measured in a 25 per cent aqueous solution, the degree of hydrolysis will not be greater than allowable.

The nature of this invention and its manner of application will be better understood from the following illustrative example.

*Example*

A styrene-maleic anhydride copolymer was prepared by charging, by weight, 53 parts of maleic anhydride, 113 parts of a 50 per cent solution of styrene in xylene, and 616 parts of xylene into a reactor, mixing and heating the mixture to 98° C. and adding 2 parts of benzoyl peroxide. The mixture was allowed to react for 45 minutes, attaining during this time a maximum temperature of 138° C.

The mixture was then cooled to 100° C. and there was added 440 parts of water and 2 parts of a 50 per cent aqueous caustic soda solution. This mixture was then held at about 90° C. for one-half hour and the xylene, which had separated out by gravitation, was siphoned off. Residual xylene remaining in the aqueous phase was then completely removed by steam distillation.

Following the complete removal of the xylene, there was added 38 parts of a 50 per cent aqueous caustic soda solution and the mixture was digested for one-half hour at 95–100° C. with agitation. The product thus obtained was found to have a pH of 5.2, measured in a 25 per cent aqueous solution.

It is observed that the amount of caustic soda added prior to complete xylene removal in this example was only one-twentieth of the total amount ultimately used. No difficulty was encountered due to emulsification, although the styrene employed contained a fraction of a per cent of polystyrene.

While in the foregoing description of this invention, there have been shown certain specific processes, it will be understood that one skilled in the art, without departing from the scope of this invention, may employ numerous processes for copolymerizing styrene and maleic anhydride and hydrolyzing the product.

I claim:

1. In a process in which styrene containing polystyrene and maleic anhydride are copolymerized in xylene solution and the copolymer is hydrolyzed in aqueous alkali solution, the steps comprising copolymerizing the styrene and maleic anhydride, adding water and an amount of alkali not greater than one-tenth of the total amount of alkali required to hydrolyze and neutralize the copolymer to a pH of from 4.8 to 5.7, measured in a 25 per cent aqueous solution, removing all of the xylene from the mixture, and thereafter hydrolyzing and neutralizing the copolymer to a pH of 4.8 to 5.7, measured in a 25 per cent aqueous solution, by digestion with additional alkali.

2. In a process in which styrene containing polystyrene and maleic anhydride are copolymerized in xylene solution and the copolymer is hydrolized in aqueous alkali solution, the steps comprising copolymerizing the styrene and maleic anhydride, adding water and an amount of alkali not greater than one-tenth of the total amount of alkali required to hydrolyze and neutralize the copolymer to a pH of from 4.8 to 5.7, measured in a 25 per cent aqueous solution, removing all of the xylene from the mixture by decantation and steam distillation, and thereafter hydrolyzing and neutralizing the copolymer to a pH of 4.8 to 5.7, measured in a 25 per cent aqueous solution, by digestion with additional alkali.

3. In a process in which styrene containing polystyrene and maleic anhydride are copolymerized in xylene solution and the copolymer is hydrolyzed in aqueous alkali solution, the steps comprising copolymerizing the styrene and maleic anhydride, adding water and an amount of alkali from about one-twentieth to not greater than one-tenth of the total amount of alkali required to hydrolyze and neutralize the copolymer to a pH of from 4.8 to 5.7, measured in a 25 per cent aqueous solution, removing all of the xylene from the mixture, and thereafter hydrolyzing and neutralizing the copolymer to a pH of 4.8 to 5.7, measured in a 25 per cent aqueous solution, by digestion with additional alkali.

4. In a process in which styrene containing polystyrene and maleic anhydride are copolymerized in xylene solution and the copolymer is hydrolyzed in aqueous alkali solution, the steps comprising copolymerizing the styrene and maleic anhydride, adding water and an amount of alkali from about one-twentieth to not greater than one-tenth of the total amount of alkali required to hydrolyze and neutralize the copolymer to a pH of from 4.8 to 5.7, measured in a 25 per cent aqueous solution, removing all of the xylene from the mixture by decantation and steam distillation, and thereafter hydrolyzing and neutralizing the copolymer to a pH of 4.8 to 5.7, measured in a 25 per cent aqueous solution, by digestion with additional alkali.

ERNEST J. TAUCH.

REFERENCES CITED

The following references are of record in the file of this patent:

UNITED STATES PATENTS

| Number | Name | Date |
|---|---|---|
| 2,220,867 | Kirk | Nov. 5, 1940 |
| 2,286,062 | Condo et al. | June 9, 1942 |